Oct. 30, 1934.　　　S. BATTILANI　　　1,978,561
PERCOLATOR
Filed Jan. 26, 1934
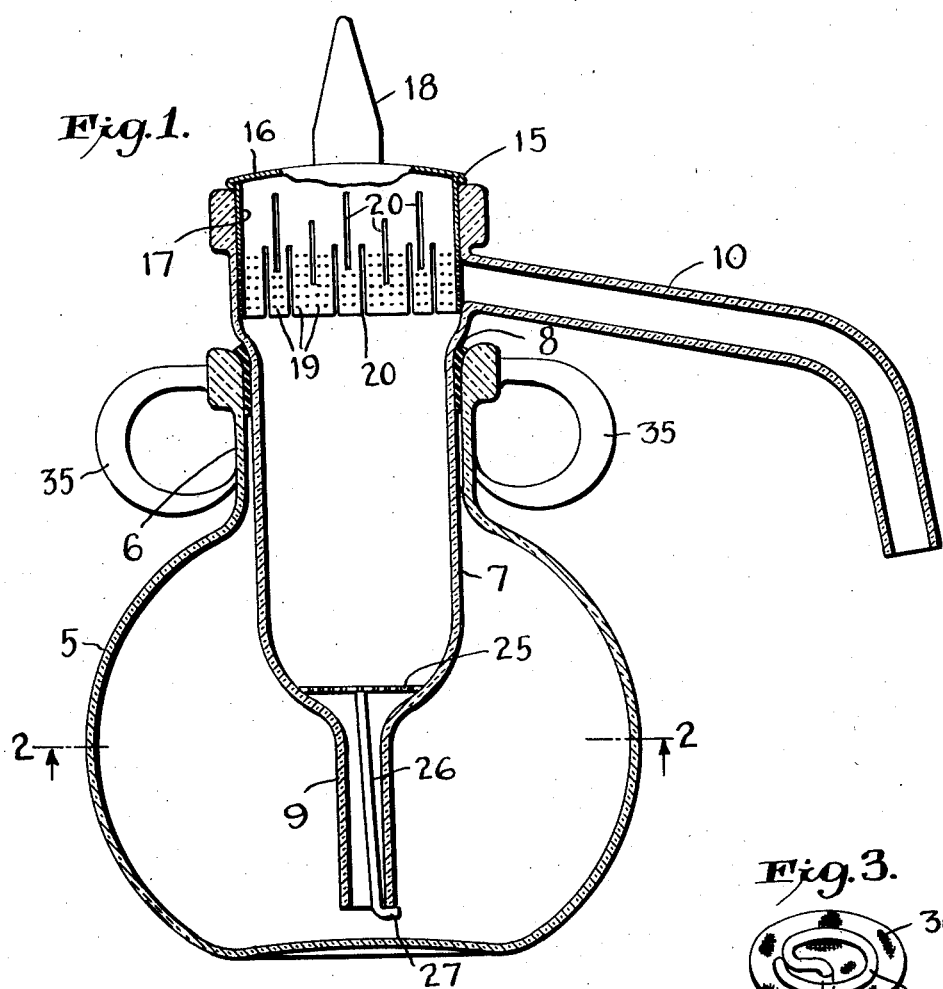
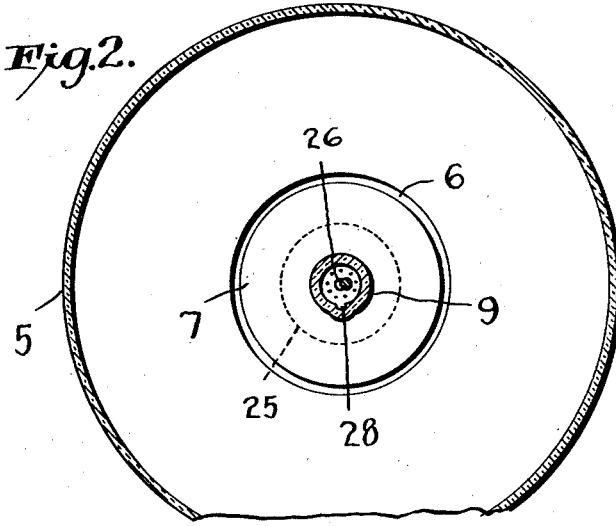
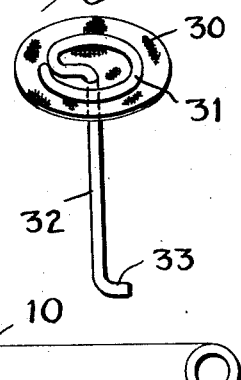
INVENTOR
*Stefano Battilani,*
BY
HIS ATTORNEY Patented Oct. 30, 1934

1,978,561

UNITED STATES PATENT OFFICE 1,978,561

PERCOLATOR

Stefano Battilani, New York, N. Y.

Application January 26, 1934, Serial No. 708,341

4 Claims. (Cl. 53—3)

The invention relates to coffee percolators and has for its object to provide a simple device of this nature for making excellent coffee.

In accordance with the invention the percolator is particularly adapted for making a small amount of coffee such as one, two, or three cups although it will be obvious the percolator may be built of a sufficient size so that any desired amount of coffee may be made.

A further object of the invention is the provision of a percolator for extracting the entire flavor from the ground coffee. By virtue of this, even an inferior grade of ground coffee will make a cup of most palatable coffee.

A further object is to make the parts of an extremely simple nature, thus making for great economies in manufacture, efficiency in operation, and ease in cleaning.

Other objects and advantages will become apparent as this specification proceeds. Referring to the drawing forming a part thereof, and in which one embodiment of the invention is illustrated:

Fig. 1 is a longitudinal sectional view;

Fig. 2 is a sectional plan view; and

Fig. 3 is a view of a modified form of filter support.

Referring again to the drawing, the reference numeral 5 designates the water receptacle. As illustrated it is substantially globular in form but it may be of any desired shape. The neck portion 6 is provided with an open mouth.

A ground coffee receptacle 7 engages with and is sealed in the open mouth. This seal may be effected in numerous different ways. As illustrated a washer or gasket 8 is provided for this purpose. However, the shapes of the open mouth and the ground coffee receptacle may be made to conform and form an effective seal, grooves may be formed in the neck and washers inserted or any other means may be used for sealing. If desired, clamps may be provided for holding the ground coffee receptacle in position.

The lower part of the ground coffee receptacle terminates in a neck 9 which forms the inlet. This neck 9 extends fairly close to the bottom of the water receptacle. The ground coffee receptacle is provided with an outlet 10 at or near its upper portion. The outlet 10 may be formed integral with the ground coffee receptacle as illustrated or it may be a detachable member, or it may be formed on the water container.

The ground coffee receptacle is open at its upper end and is provided with a cover 15. The cover 15 has a top portion 16 and depending skirt 17. A handle 18 is provided in the top portion. The skirt 17 acts as a seal for the ground coffee receptacle and in addition is arranged to form a filter for the outlet so as to prevent any coffee grounds passing into the outlet.

For this purpose, the skirt is provided with a series of fine perforations 19. Thus, no matter what position the cover is set in the ground coffee receptacle, the perforations will act as a filter for coffee passing to the outlet. If desired a filter may be provided beneath the skirt of the cover. This filter might be a perforated plate of cloth suitably secured to the skirt.

The skirt 17 in addition to the perforations 19 may be provided with a plurality of slots 20. These slots also act as a filter and in addition perform another important function. The water receptacle and the ground coffee receptacle are illustrated as being formed of glass although they may be made of any other suitable material. The cover 15 as illustrated is made of metal. The metal and glass have different coefficients of expansion under heat and the slots 20 compensate for this and prevent the cover from becoming jammed in the mouth of the ground coffee receptacle.

A filter support 25 is positioned near the outlet. This filter support may be formed of a perforated plate or cloth and prevents the ground coffee from dropping in the water. Means are provided for positioning the support and having it readily removable for cleaning purposes.

The filter 25 has a depending finger 26. This finger may be angularly disposed in relation to the filter and has a bent portion 27 on its lower end. The portion 27 engages the edge of the inlet opening and holds the filter in proper position. A groove 28 may be provided in the inlet portion to facilitate the removal and insertion of the filter.

In the form of filter illustrated in Fig. 3 a disc of filter material 30 is supported by the ring 31. The ring 31 has a depending finger 32 with an offset portion 33 at its lower end for the same purpose as that described in connection with the finger 26 and bent portion 27.

The water receptacle 5 may be provided with one or more handles 35.

In the operation the ground coffee receptacle is removed and the required amount of water poured into the water receptacle. The cover 15 is removed and the ground coffee placed in the ground coffee receptacle. The cover 15 is then placed in position and the ground coffee receptacle positioned in the mouth of the water receptacle. Heat is applied and as the water boils and steam generates, the steam will force the boiling water through the ground coffee and the outlet.

Numerous changes may be made in details of construction and arrangement of parts without departing from the spirit of the invention or the scope of the appended claims.

I claim:

1. A coffee percolator having in combination, a receptacle for water, an open mouth for said receptacle, a receptacle for ground coffee, means for sealing said ground coffee receptacle in the mouth of said water receptacle, an inlet to said ground coffee receptacle, said inlet being located near the bottom of said water receptacle, an outlet from said ground coffee receptacle, said outlet being located near the top of said ground coffee receptacle, and a cover for said ground coffee receptacle, said cover acting to seal said ground coffee receptacle and as a filter for the coffee passing through said outlet.

2. A coffee percolator having in combination, a receptacle for water, a receptacle for ground coffee extending into said water receptacle, said ground coffee receptacle having an inlet near the bottom of said water receptacle and having its upper portion sealed in said water receptacle, an outlet for said ground coffee receptacle, and a cover for said ground coffee receptacle, said cover acting to seal said ground coffee receptacle and as a filter for coffee passing through said outlet.

3. A coffee percolator having in combination, a receptacle for water, a receptacle for ground coffee extending into said water receptacle, said ground coffee receptacle having an inlet near the bottom of said water receptacle and having its upper portion sealed in said water receptacle, an outlet for said ground coffee receptacle, and a cover for said ground coffee receptacle, said cover comprising a top portion and a skirt portion, the cover acting to seal said ground coffee receptacle and its skirt portion being provided with filtering means for filtering the coffee passing through said outlet.

4. A coffee percolator having in combination, a receptacle for water, a receptacle for ground coffee extending into said water receptacle, said ground coffee receptacle having an inlet near the bottom of said water receptacle and having its upper portion sealed in said water receptacle, an outlet for said ground coffee receptacle, and a cover for said ground coffee receptacle, said cover comprising a top portion and a skirt portion, the cover acting to seal said ground coffee receptacle and its skirt portion being provided with filtering means for filtering the coffee passing through said outlet, and with a plurality of slots to compensate for differences in heat expansion of the material of which the cover is made and the material of which the ground coffee receptacle is made.

STEFANO BATTILANI.